United States Patent
Ikehashi

(10) Patent No.: US 9,490,073 B2
(45) Date of Patent: Nov. 8, 2016

(54) ELECTRONIC DEVICE

(71) Applicant: KABUSHIKI KAISHA TOSHIBA, Minato-ku, Tokyo (JP)

(72) Inventor: Tamio Ikehashi, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/656,571

(22) Filed: Mar. 12, 2015

(65) Prior Publication Data

US 2015/0310996 A1 Oct. 29, 2015

(30) Foreign Application Priority Data

Apr. 25, 2014 (JP) ................................. 2014-091001

(51) Int. Cl.
*H01G 5/40* (2006.01)
*H01G 5/16* (2006.01)

(52) U.S. Cl.
CPC . *H01G 5/40* (2013.01); *H01G 5/16* (2013.01)

(58) Field of Classification Search
CPC .................................. H01G 5/40; H01G 5/16
See application file for complete search history.

(56) References Cited

U.S. PATENT DOCUMENTS

| | | | | |
|---|---|---|---|---|
| 5,635,776 A * | 6/1997 | Imi | ......................... | H02M 3/07 307/108 |
| 7,518,892 B2 * | 4/2009 | Kitagawa | ................ | H02M 3/07 363/59 |
| 7,795,778 B2 * | 9/2010 | Ikehashi | ............... | B81B 3/0021 200/181 |
| 2011/0043960 A1 * | 2/2011 | Ikehashi | .................. | H01G 5/16 361/207 |
| 2011/0150243 A1 | 6/2011 | Onishi | | |
| 2011/0193501 A1 | 8/2011 | Ikehashi | | |
| 2011/0199147 A1 * | 8/2011 | Ikehashi | ................. | H02M 3/07 327/427 |
| 2012/0146451 A1 | 6/2012 | Nitta | | |
| 2014/0300409 A1 * | 10/2014 | Emira | ..................... | H02M 3/07 327/536 |

FOREIGN PATENT DOCUMENTS

JP 2002312045 A 10/2002
JP 2013162723 A 8/2013

* cited by examiner

*Primary Examiner* — Jung Kim
(74) *Attorney, Agent, or Firm* — Holtz, Holtz & Volek PC

(57) ABSTRACT

According to one embodiment, an electronic device includes at least one variable capacitor including a first electrode and a second electrode, and being brought into one of a first state and a second state according to a voltage applied between the first electrode and the second electrode, the first electrode and the second electrode being closer to each other in the second state compared with in the first state, and a charge pump circuit provided in a first integrated circuit chip and producing a voltage for establishing the second state. An external capacitor is connectable to the first integrated circuit chip and is receivable the voltage produced by the charge pump circuit.

17 Claims, 5 Drawing Sheets

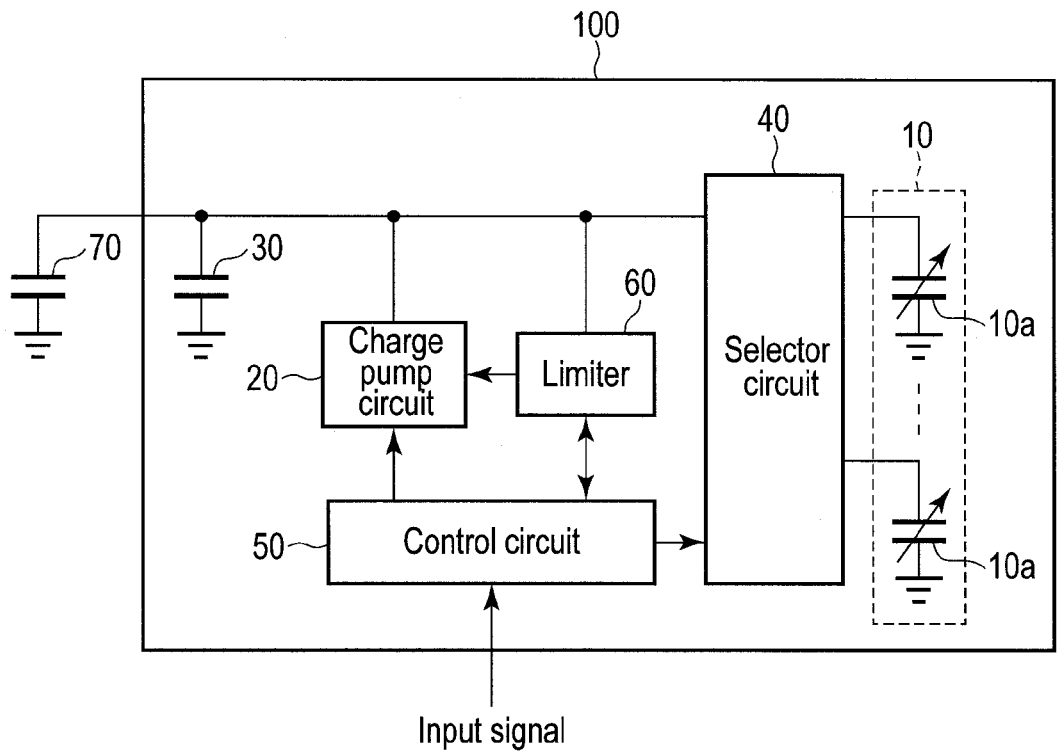
F I G. 1
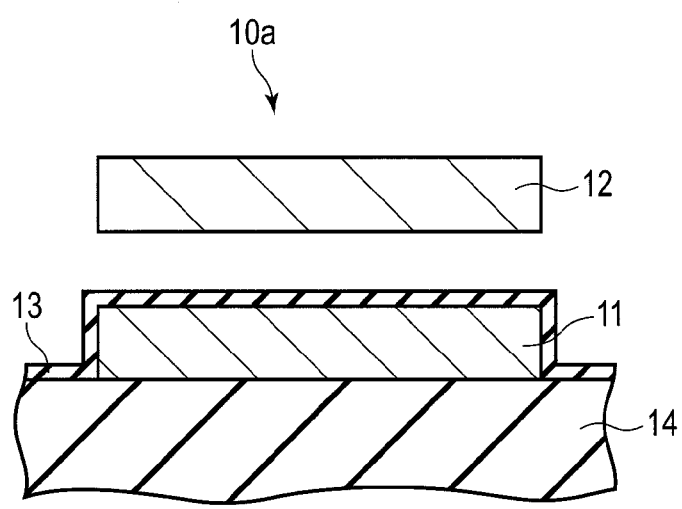
F I G. 2

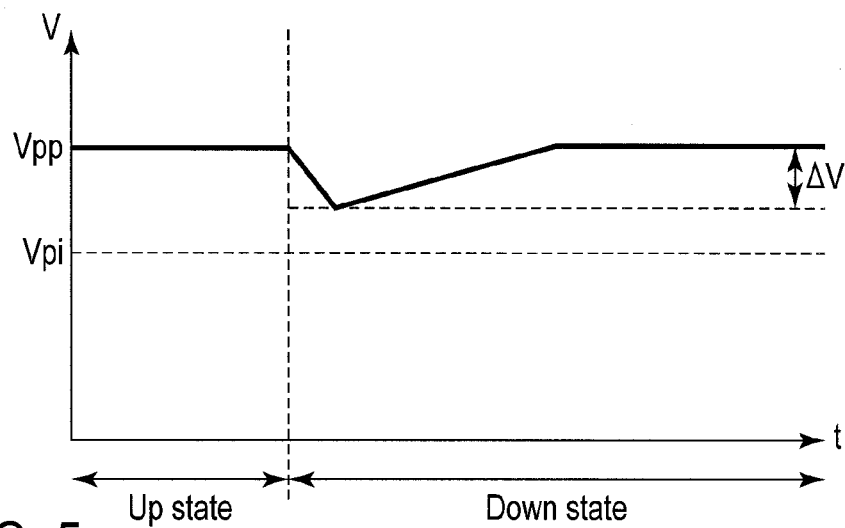
F I G. 5
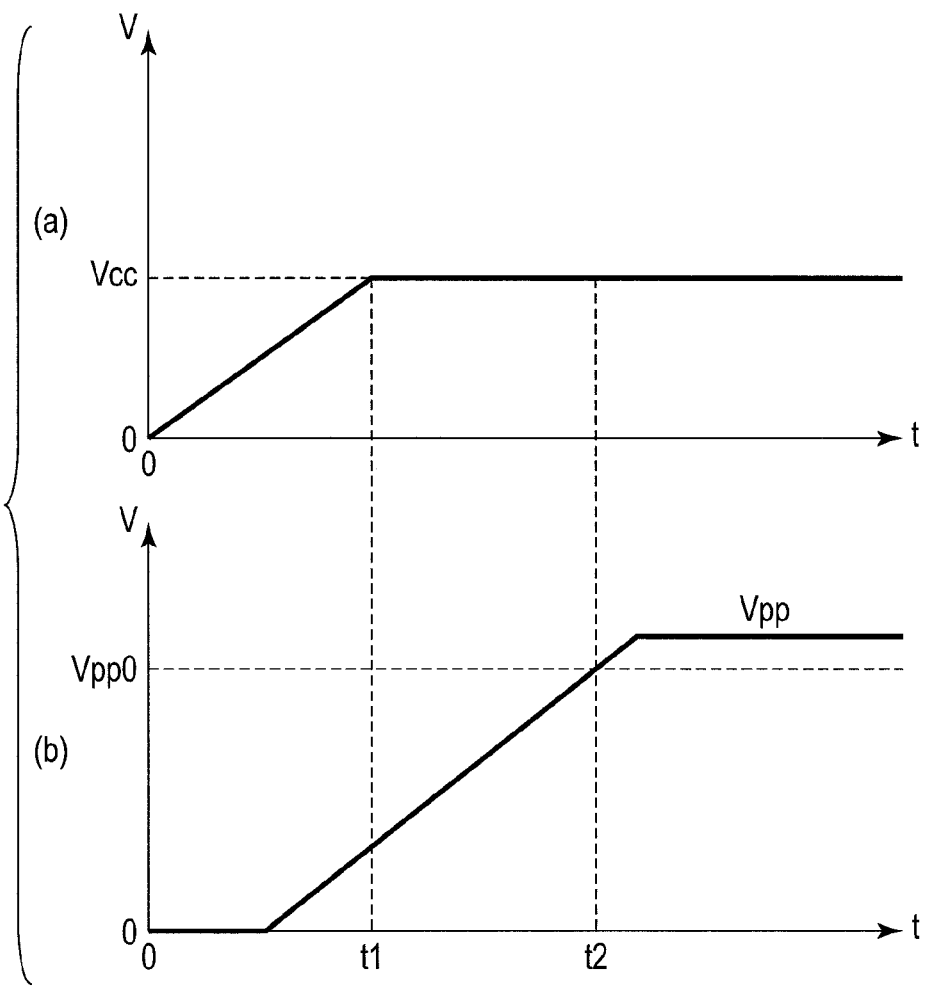
F I G. 6

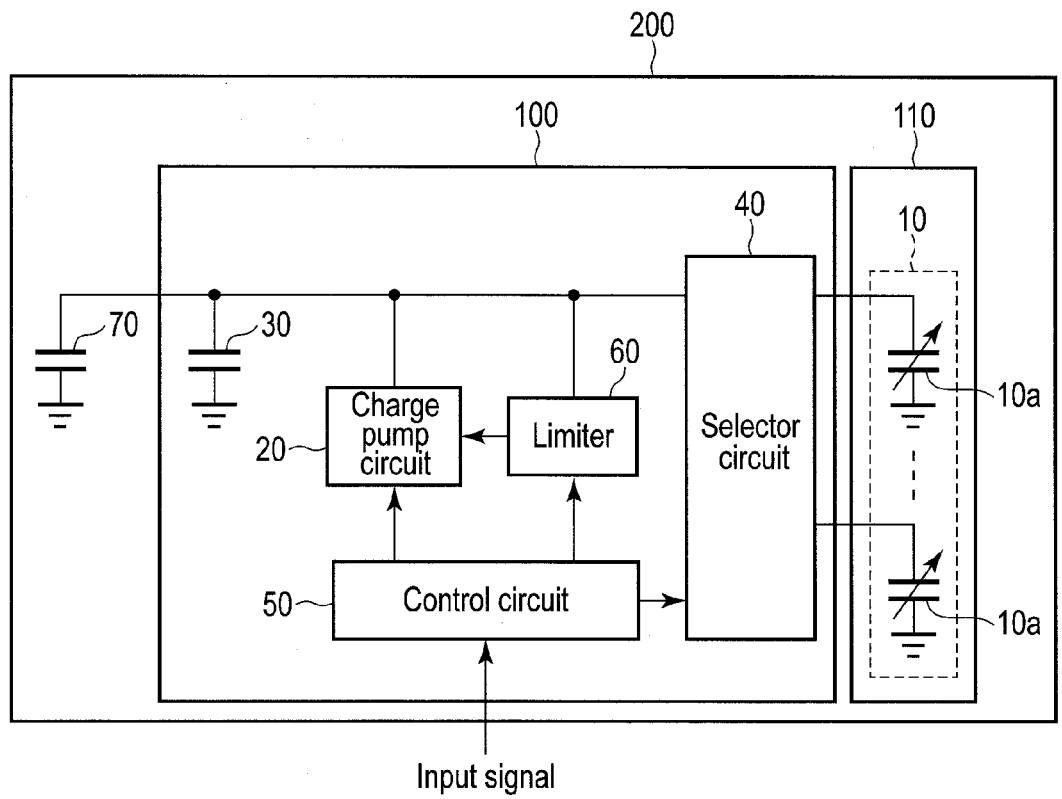
F I G. 7
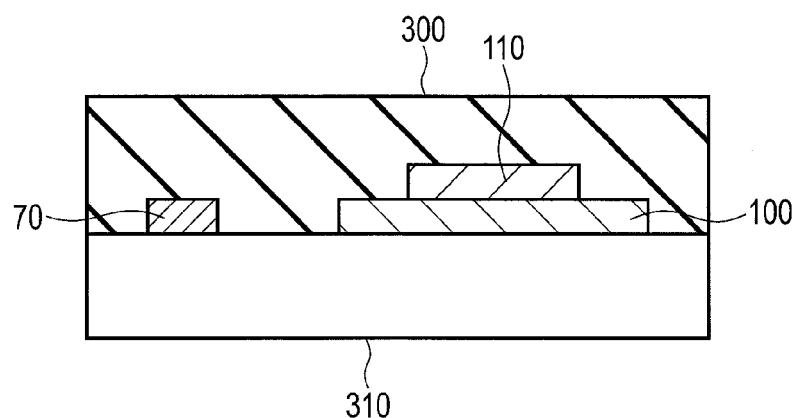
F I G. 8

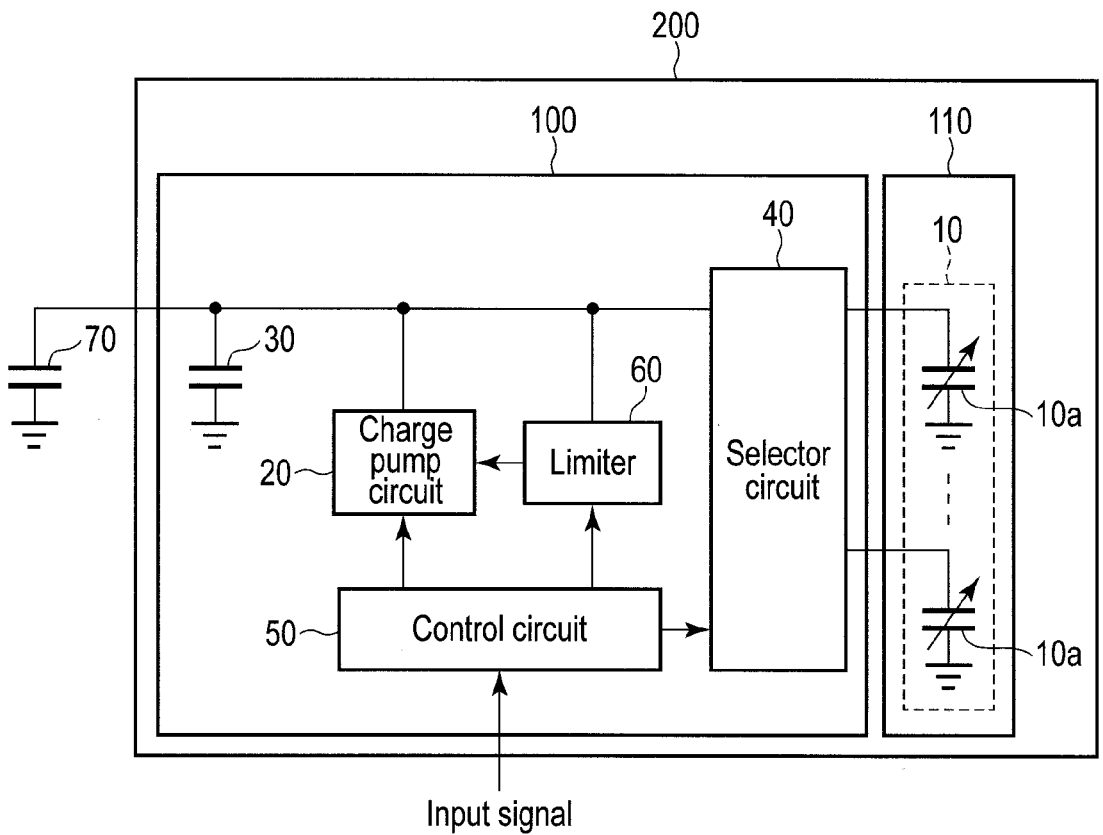
F I G. 9
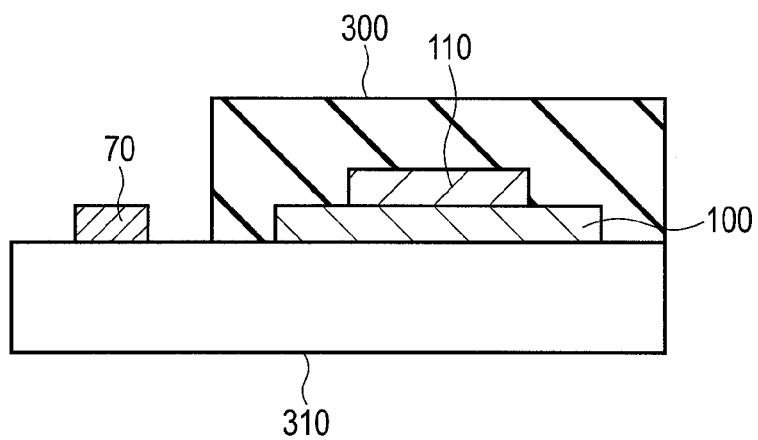
F I G. 10

ELECTRONIC DEVICE

CROSS-REFERENCE TO RELATED APPLICATIONS

This application is based upon and claims the benefit of priority from Japanese Patent Application No. 2014-091001, filed Apr. 25, 2014, the entire contents of which are incorporated herein by reference.

FIELD

Embodiments described herein relate generally to an electronic device.

BACKGROUND

A variable capacitor adopting micro-electromechanical systems (MEMS) technology is proposed. In such a capacitor, capacitance can be varied with a change in distance between two electrodes or interelectrode distance caused by changing the electrostatic attraction between the two electrodes. Specifically, the proposed variable capacitor can enter one of two states, one being an up-state which is relatively great in interelectrode distance and the other a down-state which is relatively small in interelectrode distance. A voltage produced by a charge pump circuit is applied between the two electrodes to change the capacitor from the up- to the down-state.

When a voltage produced by a charge pump circuit is applied between two electrodes of a variable capacitor, charge moves from the charge pump circuit to the variable capacitor, which may cause a problem of reduction in output voltage of the charge pump circuit or of increasing the time to switch from the up- to the down-state, impairing the switching operation of the variable capacitor.

Therefore, it is desired to provide an electronic device which is prevented from exerting a bad influence on the switching operation of a variable capacitor.

BRIEF DESCRIPTION OF THE DRAWINGS

FIG. 1 is a block diagram illustrating one configuration of an embodiment;

FIG. 2 is a cross-sectional view schematically illustrating the up-state in which a variable capacitor in the embodiment is;

FIG. 5 is a graph for explaining the operation of changing a variable capacitor in the embodiment from the up- to the down-state;

FIG. 6 comprises two graphs for explaining how voltages change at the time of applying power;

FIG. 7 is a block diagram illustrating the configuration of a first modified example;

FIG. 8 is a sectional view schematically illustrating the structure of the first modified example;

FIG. 9 is a block diagram illustrating the configuration of a second modified example; and FIG. 10 is a sectional view schematically illustrating the structure of the second modified example.

DETAILED DESCRIPTION

Figure 3:
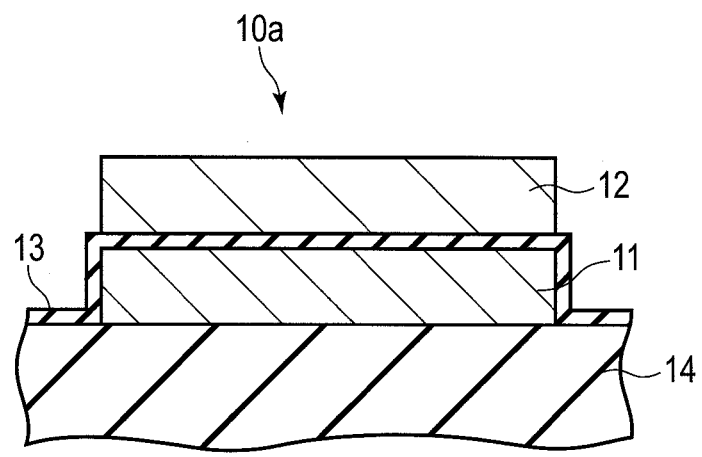
FIG. 3 is a cross-sectional view schematically illustrating the down-state in which the variable capacitor in the embodiment is.

In general, according to one embodiment, an electronic device includes: at least one variable capacitor including a first electrode and a second electrode, and being brought into one of a first state and a second state according to a voltage applied between the first electrode and the second electrode, the first electrode and the second electrode being closer to each other in the second state compared with in the first state; and a charge pump circuit provided in a first integrated circuit chip and producing a voltage for establishing the second state. An external capacitor is connectable to the first integrated circuit chip and is receivable the voltage produced by the charge pump circuit.

Now, one embodiment will be explained below with reference to the drawings.

FIG. 1 is a block diagram illustrating the configuration of the embodiment.

The electronic device illustrated in FIG. 1 comprises a variable capacitor unit 10 having a plurality of variable capacitors 10a, a charge pump circuit 20, an internal capacitor 30, a selector circuit 40, a control circuit 50, a limiter 60, and an external capacitor 70.

The variable capacitor unit 10, the charge pump circuit 20, the internal capacitor 30, the selector circuit 40, the control circuit 50 and the limiter 60 are in the same single integrated circuit chip 100. The external capacitor 70 is outside the integrated circuit chip 100.

FIG. 2 and FIG. 3 individually are a sectional view schematically illustrating the structure of any one of the variable capacitors 10a.

The variable capacitors 10a are formed on a semiconductor substrate (not illustrated in any of the drawings) using micro-electromechanical systems (MEMS) technology. Each of the variable capacitors 10a has a lower electrode (a first electrode) 11, an upper electrode (a second electrode) 12, and an insulating film 13.

The lower electrode 11 is on an underlying region 14 and is fixed to the underlying region 14. The upper electrode 12 faces the lower electrode 11 and is movable. The insulating film 13 extends between the upper electrode 12 and the lower electrode 11, and lies over both the lower electrode 11 and the underlying region 14.

Any one of the variable capacitors 10a is capable of entering the up-state (a first state) or the down-state (a second state) according to the voltage applied between a lower electrode 11 and an upper electrode 12. That is, a variable capacitor 10a can enter the up- or the down-state according to the electrostatic force acting between a lower electrode 11 and an upper electrode 12. Specifically, an application of a pull-in voltage Vpi between a lower electrode 11 and an upper electrode 12 changes a capacitor from the up- to the down-state.

FIG. 2 illustrates the up-state and FIG. 3, the down-state. In the up-state, an upper electrode 12 is away from a lower electrode 11, which is covered with an insulating film 13, as illustrated in FIG. 2. That is, there is a space between the upper electrode 12 and the lower electrode 11. In contrast in the down-state, the upper electrode 12 is close to the lower electrode 11 and the upper electrode 12 touches the insulating film 13, as illustrated in FIG. 3. Therefore, the distance between the lower electrode 11 and the upper electrode 12 is shorter in the down-state compared with the up-state.

Figure 4:
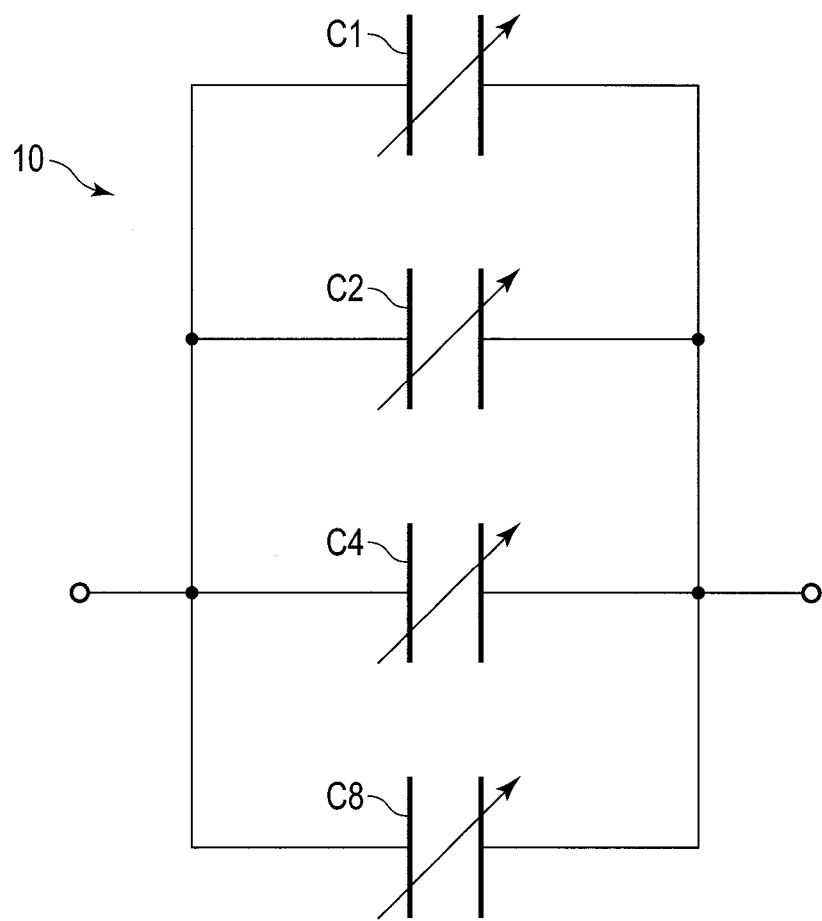
FIG. 4 is a circuit diagram illustrating an exemplified circuit configuration of a variable capacitor unit in the embodiment.

FIG. 4 is a circuit diagram illustrating an exemplified circuit configuration of a variable capacitor unit 10. In this circuit configuration, the variable capacitor unit 10 has four variable capacitors C1, C2, C4 and C8.

Variable capacitors C2, C4 and C8 respectively have two, four and eight times the capacitance of variable capacitor C1. Specifically, variable capacitors C2, C4 and C8 have respectively two, four and eight times the electrode area of variable capacitor C1. Variable capacitors C1, C2, C4 and C8 are equal in interelectrode distance when they are all in the up-state. Variable capacitors C1, C2, C4 and C8 are also equal in interelectrode distance when they are all in the down-state. It is possible to obtain a total of 16 different capacitive combinations using variable capacitors C1, C2, C4 and C8.

The charge pump circuit 20 produces a voltage for causing any of the variable capacitors 10a to enter the down-state. For instance, the power source voltage (3V, for instance) is boosted up, and a boosted voltage (30V, for instance) is obtained.

The internal capacitor 30 is a capacitor provided in the integrated circuit chip 100. The boosted voltage produced by the charge pump circuit 20 is applied to the internal capacitor 30. Specifically, the internal capacitor 30 is connected in parallel with the charge pump circuit 20, and the internal capacitor 30 is charged with the boosted voltage. The capacitance of the internal capacitor 30 is smaller than the capacitance of the external capacitor 70, which will be described below.

The external capacitor 70 is outside the integrated circuit chip 100. The boosted voltage produced by the charge pump circuit 20 is also applied to the external capacitor 70. Specifically, the external capacitor 70 is connected in parallel with the charge pump circuit 20, and the external capacitor 70 is charged with the boosted voltage. The capacitance of the external capacitor 70 is sufficiently greater than the capacitance of the internal capacitor 30.

As long as the integrated circuit chip 100 is active, the external capacitor 70 is kept charged. That is, the external capacitor 70 is kept charged so long as any variable capacitor 10a is in a stand-by state, which the variable capacitor 10a maintains before it changes from the up- to the down-state, or is in a state which the variable capacitor 10a maintains after it has entered the down-state.

The external capacitor 70 has a very large capacitance. Specifically, the charge stored in the external capacitor 70 makes it possible to change all the variable capacitors 10a in the variable capacitor unit 10 from the up- to the down-state. That is, the charge stored in the external capacitor 70 makes it possible to apply a voltage higher than the pull-in voltage Vpi between the lower electrode 11 and the upper electrode 12 of each of the variable capacitors 10a at a time.

The selector circuit 40 selects at least one desired variable capacitor from the variable capacitors 10a in the variable capacitor unit 10. The selected at least one variable capacitor 10a is set in the down-state. The selector circuit 40 comprises a switch matrix. For instance, when the variable capacitor unit 10 has four variable capacitors C1, C2, C4 and C8 as illustrated in FIG. 4, the selector circuit 40 can set a total of 16 different capacitive combinations.

The control circuit 50 receives an input signal and controls every part illustrated in FIG. 1. Specifically, the control circuit 50 executes boost control of the charge pump circuit 20 and selection control of the selector circuit 40. The control circuit 50 prevents the variable capacitors 10a from entering the down-state until the output of the charge pump circuit 20 reaches a predetermined voltage.

The limiter 60 compares the output of the charge pump circuit 20 to a reference voltage. The comparison result of the limiter 60 is sent to the control circuit 50. When the output of the charge pump circuit 20 is lower than the reference voltage, the control circuit 50 prevents the variable capacitors 10a from entering the down-state.

Next, how the present embodiment will work will be explained below.

The setting of each of the variable capacitors 10a in the variable capacitor unit 10 or the setting of whether the variable capacitors 10a should be separately brought into the up- or the down-state is executed based on an input signal supplied to the control circuit 50. The control circuit 50 sends a control signal (a selection signal) to the selector circuit 40 based on the input signal. The switch matrix is suitably used at the selector circuit 40 based on the control signal (the selection signal). As a result, the variable capacitors 10a are separately set either in the down- or the up-state.

The selector circuit 40 is supplied with the output of the charge pump circuit 20 (a voltage of an output node). The output node of the charge pump circuit 20 is connected with the external capacitor 70. The external capacitor 70 is previously charged with the voltage of the output node of the charge pump circuit 20. As has been described before, the external capacitor 70 has a very large capacitance. Therefore, the variable capacitors 10a will be quickly charged with the voltage of the previously charged external capacitor 70 when they are individually made to change from the up- to the down-state.

FIG. 5 is a view for explaining how the variable capacitors 10a individually change from the up- to the down-state. The horizontal axis represents time (t) and the vertical axis represents voltage (V).

In FIG. 5, Vpp denotes a regular voltage which the charge pump circuit 20 produces in a regular state. In the regular state, the external capacitor 70 is charged with voltage Vpp. Vpi denotes a pull-in voltage, and corresponds to a necessary minimum voltage which is required for bringing the variable capacitors 10a into the down-state. Application of a voltage, which greater than or equal to voltage Vpi to the interelectrode of each of the variable capacitors 10a makes it possible to change each of the variable capacitors 10a from the up- to the down-state. ΔV denotes a voltage drop which occurs when all the variable capacitors 10a in the variable capacitor unit 10 have changed from the up- to the down-state (the output voltage of the charge pump circuit 20 drops from voltage Vpp).

In order to surely change all of the variable capacitors 10a from the up- to the down-state, the value obtained by subtracting voltage drop ΔV from voltage Vpp must be larger than the pull-in voltage Vpi. Therefore, the aforementioned Vpp, Vpi and ΔV must satisfy the following relationship:

$$Vpp - \Delta V > Vpi \tag{1}$$

Furthermore, when all the variable capacitors 10a are changed from the up- to the down-state, the following relationship must be satisfied because of charge conservation:

$$Vpp(Cext + Cint + Cup) = (Vpp - \Delta V)(Cext + Cint + Cdown) \tag{2}$$

In the expression (2), Cext denotes the capacitance of the external capacitor 70, Cint denotes the capacitance of the internal capacitor 30, Cup denotes the total capacitance when all the variable capacitors 10a are in the up-state, and Cdown denotes the total capacitance when all the variable capacitors 10a are in the down-state.

A preferable condition of capacitance Cext can be obtained from expressions (1) and (2). Let us suppose here that capacitance Cext is sufficiently larger than each of capacitance Cint and capacitance Cup. That is, in expressions (1) and (2), let us suppose that Cext>>Cint and Cext>>Cup may be established. In this case, a desirable condition for capacitance Cext will be as follows:

$$Cext > Vpi \cdot Cdown/(Vpp-Vpi). \quad (3)$$

Accordingly, it is desirable that the capacitance Cext of the external capacitor 70 should be determined to satisfy the expression (3). For instance, if Vpp=30V, Vpi=25V, and Cdown=400 pF are established, then Cext>2 nF will be established.

FIG. 6(a) and FIG. 6(b) are individually a graph for explaining how voltage changes when power is applied. FIG. 6(a) is a graph illustrating how a power source changes in voltage. FIG. 6(b) is a graph illustrating how the output node of the charge pump circuit 20 changes in voltage. In each of FIG. 6(a) and FIG. 6(b), the horizontal axis indicates time (t) and the vertical axis indicates voltage (V).

As illustrated in FIG. 6(a), the voltage of the power source reaches the power source voltage Vcc at time t1 after the power has been applied. However, since the capacitance of the external capacitor 70 is very large, the voltage of the output node of the charge pump circuit 20 does not yet reach voltage Vpp at time t1, as illustrated in FIG. 6(b).

As has been explained before, the application of a voltage, which is equal to or more than the pull-in voltage Vpi, to the interelectrode of each of the variable capacitors 10a makes it possible to change each of the variable capacitors 10a from the up- to the down-state. Therefore, until the output of the charge pump circuit 20 reaches a predetermined voltage, the variable capacitors 10a must be prevented from entering the down-state. Let us suppose here that Vpp0 stands for the predetermined voltage. Then, predetermined voltage Vpp0 must be made larger than the minimum voltage (the pull-in voltage Vpi) which is required for changing the variable capacitors 10a from the up- to the down-state. That is, it is desirable that Vpp0 and Vpi satisfy the following relationship:

$$Vpp0 > Vpi \quad (4).$$

The limiter 60 compares the output of the charge pump circuit 20 to a reference voltage (predetermined voltage Vpp0). The comparison result is sent to the control circuit 50. When the output of the charge pump circuit 20 is lower than the reference voltage (predetermined voltage Vpp0), the variable capacitors 10a are prevented from entering the down-state. Specifically, reception of the input command to bring the variable capacitors 10a into the down-state will be disabled.

As has been explained above, in the present embodiment, the external capacitor 70 is external to the integrated circuit chip 100, which comprises the charge pump circuit 20 or the like, and the external capacitor 70 is charged with the voltage produced by the charge pump circuit.

The provision of the external capacitor 70 in this way makes it possible to rapidly apply a desired voltage to the variable capacitors 10a using the charge stored in the external capacitor 70 when the variable capacitors 10a should be changed from the up- to the down-state. Therefore, a problem that the output voltage of the charge pump circuit 20 tends to decrease when the variable capacitors 10a are made to enter the down-state, or that the period required to switch from the up- to the down-state tends to be increased will be eliminated by increasing the capacitance of the external capacitor 70. Therefore, it is possible to obtain an electronic device which cannot impair the switching operation of each of the variable capacitors.

In addition, since the external capacitor 70 is outside the integrated circuit chip 100, the area of the integrated circuit chip 100 will be greatly reduced. More specifically, since the external capacitor 70 has a very large capacitance, an area which the external capacitor 70 occupies will be large. However, since the external capacitor 70 is outside the integrated circuit chip 100, the area of the integrated circuit chip 100 can be made small.

Furthermore, the provision of the external capacitor 70 makes it possible to reduce ripples of the output node of the charge pump circuit 20. The effect of reduction in ripples will be especially advantageous to RF-MEMS in which noises in a high frequency band will be a serious problem.

Moreover, the provision of the external capacitor 70 makes it possible to reduce power consumption, because the variable capacitors 10a will be driven by the charge stored in the external capacitor 70.

Furthermore, the use of the conditions satisfying expression (1) or (3) makes it possible to surely change any of the variable capacitors 10a from the up to the down-state.

In addition, since the variable capacitors 10a are prevented from entering the down-state until the output of the charge pump circuit 20 reaches predetermined voltage Vpp0, it is possible to surely make the variable capacitors 10a enter the down-state only when an input command for individually setting the variable capacitors 10a in the down-state is received.

It should be noted that the variable capacitor unit 10 is in the integrated circuit chip 100 having the charge pump circuit 20 or the like in the above embodiment, but instead it is possible to include the variable capacitor unit 10 in a different integrated circuit chip (a second integrated circuit chip) separate from the integrated circuit chip 100. Even in such a case, an effect that is the same as the aforementioned effect will be obtained. Now, two examples (a first modification and a second modification) belonging to such a case will be explained below.

FIG. 7 is a block diagram illustrating the configuration of a first modified example. FIG. 8 is a sectional view schematically illustrating the structure of the first modified example.

As illustrated in FIG. 7, there are provided in an integrated circuit chip 100 (a first integrated circuit chip) a charge pump circuit 20, an internal capacitor 30, a selector circuit 40, a control circuit 50 and a limiter 60. A variable capacitor unit 10 is in a different integrated circuit chip (a second integrated circuit chip) 110 separate from the integrated circuit chip 100.

In the present modification, the integrated circuit chip 100, the integrated circuit chip 110 and the external capacitor 70 constitutes a single module 200. That is, in the present modification, the integrated circuit chip 100, the integrated circuit chip 110 and the external capacitor 70 are covered with a common covering body 300 as illustrated in FIG. 8.

In the example illustrated in FIG. 8, an integrated circuit chip 100 is on a substrate 310, and an integrated circuit chip 110 is on the integrated circuit chip 100. In addition, an external capacitor 70 is on the substrate 310. The integrated circuit chip 100, the integrated circuit chip 110 and the external capacitor 70 are covered with a common covering body 300. Resin is used for the covering body 300.

As explained above, the external capacitor 70 is modularized along with the integrated circuit chips 100 and 110 in the present modification. Therefore, signal delays or the like can be suppressed, which makes it possible to provide a device excellent in performance.

FIG. 9 is a block diagram illustrating the configuration of a second modified example. FIG. 10 is a sectional view schematically illustrating the structure of the second modified example.

In this modification, a charge pump circuit 20, an internal capacitor 30, a selector circuit 40, a control circuit 50, and a limiter 60 are in an integrated circuit chip 100 (a first integrated circuit chip), whereas a variable capacitor unit 10 is in a different integrated circuit chip (a second integrated circuit chip) 110 separate from the integrated circuit chip 100

In the present modification, the integrated circuit chip 100 and the integrated circuit chip 110 constitute a single module, and the external capacitor 70 is outside the module. That is, in the present modification, the integrated circuit chip 100 and the integrated circuit chip 110 are covered with a common covering body 300, whereas the external capacitor 70 is outside the common covering body 300, as illustrated in FIG. 10.

In the example illustrated in FIG. 10, an integrated circuit chip 100 is on a substrate 310, and an integrated circuit chip 110 is on the integrated circuit chip 100. The integrated circuit chip 100 and the integrated circuit chip 110 are covered with a common covering body 300. An external capacitor 70 is outside the common covering body 300.

As has been explained above, the external capacitor 70 is outside the module comprising the integrated circuit chips 100 and 110 in the present modification. Therefore, it is possible to make the module very small.

It should be noted that the variable capacitor unit 10 has a plurality of variable capacitors 10a in the above embodiment or in each of the above modifications. However, it is suffice that the variable capacitor unit 10 has at least one variable capacitor 10a. That is, it is possible that the variable capacitor unit 10 may have a single variable capacitor 10a alone. Even if the variable capacitor unit 10 has a single variable capacitor 10a alone, an effect that is the same as the aforementioned effect will be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    at least one variable capacitor including a first electrode and a second electrode, and being brought into one of a first state and a second state according to a voltage applied between the first electrode and the second electrode, the first electrode and the second electrode being closer to each other in the second state compared with the first state;
    a charge pump circuit provided in a first integrated circuit chip and producing a voltage for establishing the second state; and
    a control circuit configured to prohibit establishing the second state until an output voltage of the charge pump circuit reaches a predetermined voltage;
    wherein an external capacitor is connectable to the first integrated circuit chip and is receivable of the voltage produced by the charge pump circuit.

2. The electronic device of claim 1, wherein the following relationship is satisfied:

$$Vpp0 > Vpi,$$

where Vpp0 represents the predetermined voltage, and Vpi represents a minimum voltage required for establishing the second state.

3. The electronic device of claim 1, wherein the control circuit is provided in the first integrated circuit chip.

4. The electronic device of claim 1, further comprising:
    a selector circuit configured to select from the at least one variable capacitor at least one desired variable capacitor to establish the second state.

5. The electronic device of claim 4, wherein the selector circuit is provided in the first integrated circuit chip.

6. The electronic device of claim 1, wherein the first electrode is fixed and the second electrode is movable.

7. The electronic device of claim 6, wherein the variable capacitor further includes an insulating film located between the first electrode and the second electrode and provided on the first electrode.

8. The electronic device of claim 7, wherein the second electrode is in contact with the insulating film when the second state is established.

9. The electronic device of claim 1, wherein the at least one variable capacitor is provided in the first integrated circuit chip.

10. The electronic device of claim 1, wherein the at least one variable capacitor is provided in a second integrated circuit chip different from the first integrated circuit chip.

11. The electronic device of claim 10, wherein the first integrated circuit chip, the second integrated circuit chip and the external capacitor are covered with a common covering body.

12. The electronic device of claim 11, wherein the first integrated circuit chip, the second integrated circuit chip and the external capacitor are provided on a substrate.

13. The electronic device of claim 10, wherein the first integrated circuit chip and the second integrated circuit chip are covered with a common covering body, and the external capacitor is provided outside the common covering body.

14. The electronic device of claim 13, wherein the first integrated circuit chip, the second integrated circuit chip and the external capacitor are provided on a substrate.

15. The electronic device of claim 1, further comprising:
    an internal capacitor provided in the first integrated circuit chip, receiving the voltage produced by the charge pump circuit, and having a capacitance smaller than that of the external capacitor.

16. The electronic device of claim 1, wherein the following relationship is satisfied:

$$Vpp - \Delta V > Vpi,$$

where Vpp represents the voltage produced by the charge pump circuit, $\Delta V$ represents a voltage drop of the output voltage of the charge pump circuit occurring upon all the at least one variable capacitor changing from the first state to the second state, and Vpi represents a minimum voltage required for establishing the second state.

17. The electronic device of claim 1, wherein the following relationship is satisfied:

$$Cext > Vpi \cdot Cdown/(Vpp - Vpi),$$

where Vpp represents the voltage produced by the charge pump circuit, Vpi represents a minimum voltage required for establishing the second state, Cext represents capacitance of the external capacitor, and Cdown represents a total capacitance of the at least one variable capacitor upon all the at least one variable capacitor being in the second state.

\* \* \* \* \*